Feb. 3, 1970   F. W. HANNULA   3,493,755
SOURCE-DETECTOR CONFIGURATION FOR NUCLEAR BACKSCATTER GAUGE
Filed March 20, 1967   2 Sheets-Sheet 2
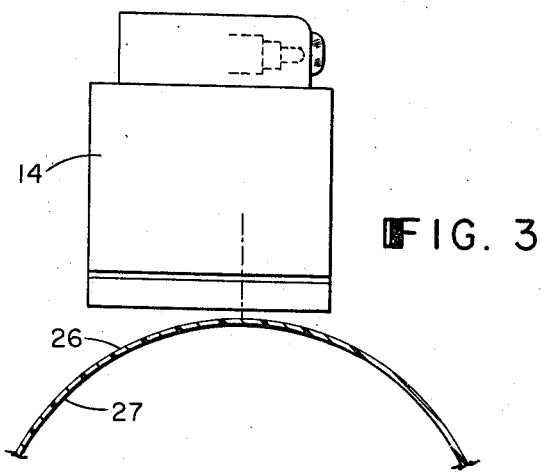
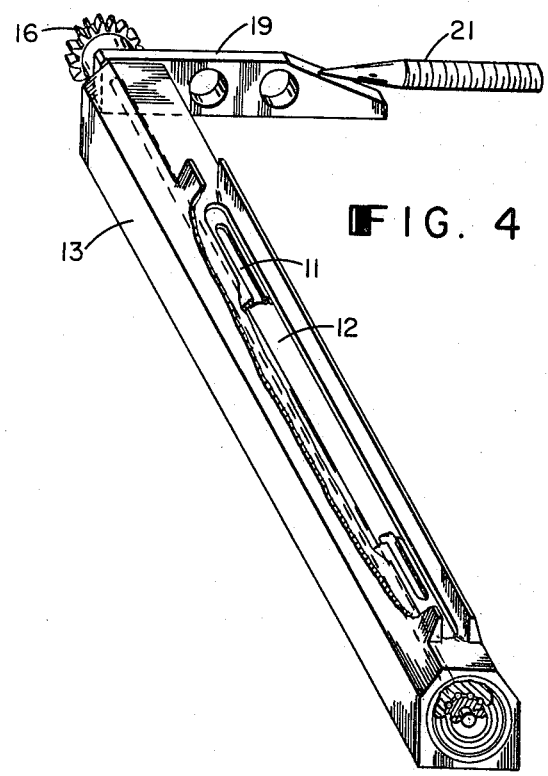
INVENTOR.
FRED W. HANNULA United States Patent Office 3,493,755
Patented Feb. 3, 1970

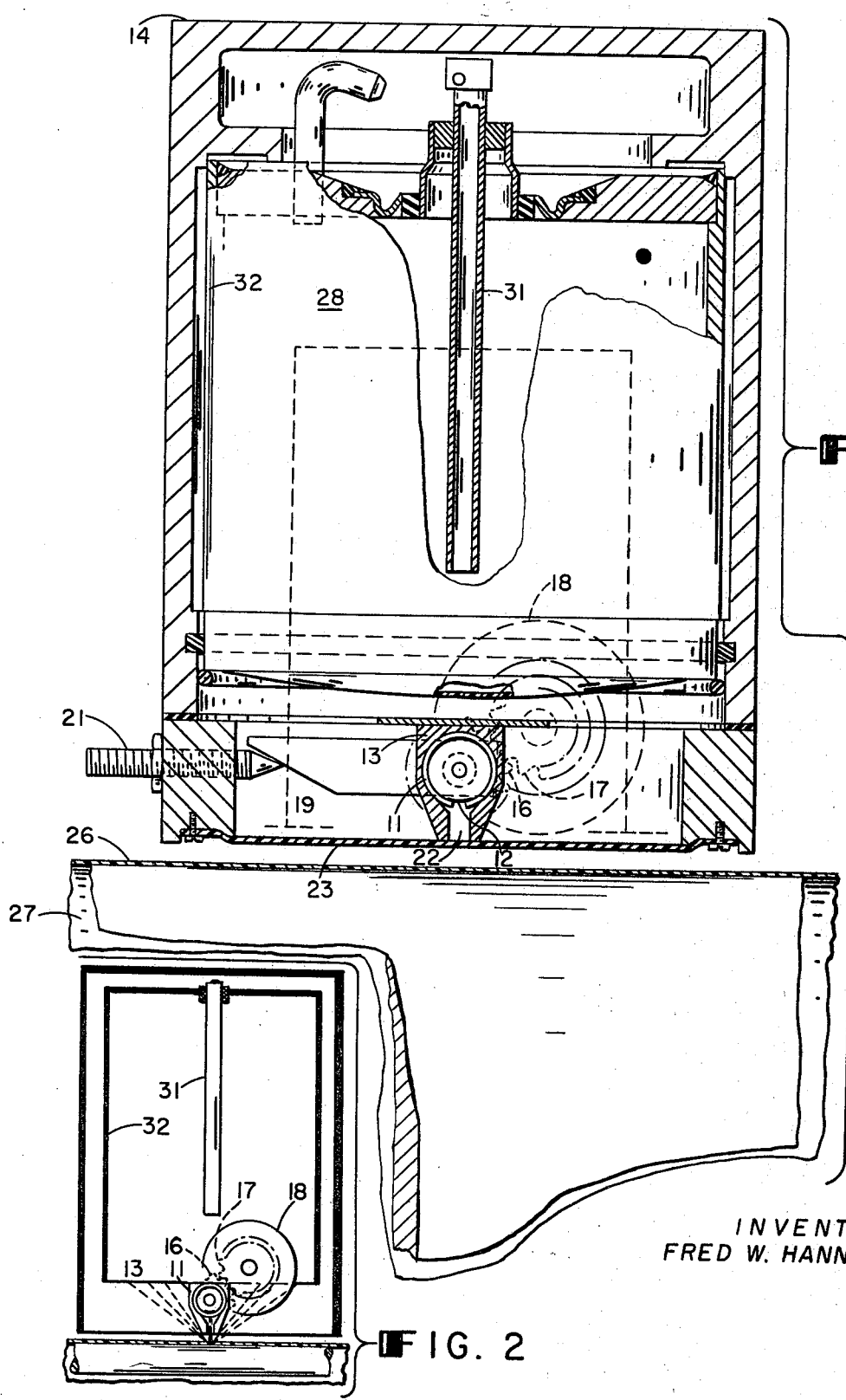

3,493,755
SOURCE-DETECTOR CONFIGURATION FOR
NUCLEAR BACKSCATTER GAUGE
Fred W. Hannula, Medfield, Mass., assignor to LFE Corporation, Boston, Mass., a corporation of Delaware
Filed Mar. 20, 1967, Ser. No. 624,356
Int. Cl. G01t 1/16
U.S. Cl. 250—83.3                                    3 Claims

ABSTRACT OF THE DISCLOSURE

The invention described by this disclosure relates to a non-contacting radiation gauge for measuring the thickness of strips of material.

The gauge in the present invention is located on one side and at a substantially fixed distance from a strip of material to be measured. The source element of the gauge emits radiation energy by way of an elongated collimation slot towards the strip. In one embodiment the majority of the emitted radiation passes through the strip, impinges upon a backscattering material disposed on the other side of the strip, and is returned through the strip to the gauge. The characteristics of the returned radiation, and in particular its power or quantity per unit time, have a known relationship to the weight per unit area of the strip, which may then be converted to thickness on the basis of its density. The gauge source element is a radioisotope contained in an elongated capsule that emits a suitable nuclear radiation such as alpha, beta, or gamma radiation. The radiation returned to the gauge by the backscatter process is sensed by an ionization chamber that serves as a radiation detector. A feature of the invention is the application of a thin line source of radiation, rather than the conventional point source, so as to obtain substantially greater irradiation of the material per milli-Curie of source strength. The line source further provides a capability for measuring narrow strip samples for streak detection by orienting the line source parallel to the longitudinal dimension of the strip or measuring wide samples for average thickness values by orienting the source transverse to the strip longitudinal direction. The gauge also exhibits a configuration that enhances the signal to noise ratio of the measurement, and also includes many personnel safety features.

BACKGROUND OF INVENTION

This invention relates to the measurement of the thickness of strips of sheet material and the like, and more particularly to a nuclear gauge that can efficiently measure wide strips for average thickness or narrow strips for narrow irregularities of sheet thickness extending in the longitudinal sheet direction, which irregularities are generally referred to in the art as streaks.

The nuclear gauges now in use that employ the backscatter principle to measure the thickness of strips of material for streak detection include radiation sources that require excessive source strength to achieve a satisfactory signal to noise ratio at the detector. The point, or very small area, source used with some of these gauges requires a considerable source strength to provide an adequate irradiation of the strip, since the signal quality is a function of source area. Large area circular sources used with other gauges overcome this source strength limitation, but cannot be used to measure narrow strips for streak detection since the irradiated area is too wide. Other problems encountered with present nuclear backscatter gauges are that the source and is housing substantially interfere with the radiation returning from the backscattering material; internal backscattering within the gauge introduces noise contamination onto the signal returning from the backscattering material; plateau distances to the moving strip are difficult to achieve; radiation safety features are cumbersome and inadequate; and it is difficult to collimate the radiation.

SUMMARY

This invention contemplates a nuclear backscatter gauge that measures the weight per unit area of a strip of sheet material. The gauge includes an elongated radiation source element that may be oriented either in a transverse direction with respect to the longitudinal dimension of the strip for wide strip averaging, or parallel to the strip longitudinal dimension for narrow strip streak detection. The source housing includes a tapered edge that present a minimum or selected obstruction to the backscattered radiation, and it is formed to eliminate or substantially reduce the effects of internal backscattering within the gauge. The source capsule can be rotated within its housing to initiate or terminate the emission of radiation from the gauge, and positioned by external adjustments to achieve a preferred irradiation of the moving strip.

BRIEF DESCRIPTION OF THE DRAWINGS

The novel features of the invention, together with further objects and advantages, will become apparent from the following detailed description and the drawings to which it refers. In the drawings:

FIG. 1 is a sectional view of the gauge that shows its essential elements and also its position relative to the backscattering material.

FIG. 2 is a diagrammatic view that shows the trajectories of the radiation relative to the essential gauge elements.

FIG. 3 is a side view of the gauge that also shows its position relative to the backscattering material.

FIG. 4 is a perspective view of the radioisotope source, its housing, and associated adjustment mechanisms.

DESCRIPTION OF THE PREFERRED EMBODIMENTS

A preferred embodiment of this invention is illustrated by the drawings that show the gauge assembly positioned relative to the backscattering material. The source capsule 11 contains a radioactive emitter such as krypton 85, promethium 147, or strontium 90, and the capsule includes a window 12 that presents a low attenuation path for the passage of this radiation while preventing the source material from escaping. The capsule 11 is confined within a housing 13 and may be rotated relative to the gauge housing 14. Gears 16 and 17 which are electromechanically actuated by a rotary solenoid 18 serve to rotate the capsule 11. The capsule rotation is stopped by arm 19 making contact with screw 21, and the stop position can be adjusted by turning the screw. The radiation which emerges from the capsule window passes through slot 22 in the housing 13, through window 23 in the gauge housing 14, and then through the moving strip 26 located between the window 23 and the backscattering material 27. Some of the radiation is returned through the moving strip to the ionization chamber 28. This ionizes the gas in the ionization chamber and causes a current to flow between the anode 31 and the chamber wall 32. This current is amplified by suitable and conventional electrical circuits, and displayed on an indicator. The sides of housing 13 extend to the window 23 in order to eliminate or substantially reduce internal backscattering that would otherwise cause undesirable noise on the measurement signal. These sides also may be tapered to present a minimum obstruction to the backscattered radiation. The length of the sides 13 are chosen to achieve a plateau distance that reduces the adverse effect of inadvertent relative motion between the gauge and the backscattering material. For example, in a measurement made with an ionization detector 28 of diameter 4½ inches positioned behind a source of the configuration shown in FIG. 1, where the cross-sectional dimension of the source tapers from a 1 inch width at the top to a ⅗ inch width at the bottom, including a ⅛ inch opening, a plateau was obtained with the distance between the edge of the source housing 13 and the material approximately .3 inch. Under the same circumstances of source strength and ionization chamber, utilizing a source configuration with no taper, so that the source width remained at 1 inch, with a ⅛ inch opening in the center, a plateau was obtained with a separation between the edge of the housing 13 and the material of .5 inch and the signal in the latter case was less than ⅔ of the signal in the former case. That is, plateau is defined as that separation distance between the detector and the sheet being measured wherein either the gauge or the material may vibrate without substantially affecting the magnitude of current provided by the detector in response to impingent radiation. Thus, by locating the detector at plateau, errors usually produced by unavoidable slight variances in the separation distance between the gauge and sheet may be avoided.

In use, the gauge assembly is positioned to achieve a predetermined spacing between window 23 and backscattering material 27, and the sheet material is positioned between the window 23 and waterial 27. Gears 16 and 17 are rotated until arm 19 strikes screw 21, and the screw is adjusted until a maximum current appears at the ionization chamber output terminals. The gauge assembly is oriented to place the longitudinal dimension of the source capsule parallel to the longitudinal direction of the strp to achieved a streak detection capability or transverse to the strip longitudinal direction to achieve an average thickness measurement. The strip may be moved either by rotating the backscattering material or by sliding this material across the surface. The radiation emerges from the gauge assembly through window 23, and some is returned through the window from the backscattering material after having passed twice through the strip. The returned radiation enters the ionization chamber and causes a current to flow through an external circuit connected to the chamber. The magnitude of the current provides a measure of the thickness of the sheet material.

What is claimed is:

1. A nuclear backscatter gauge for measuring the weight per unit area of a thin strip of material comprising:
    (a) a gauge housing, said gauge housing having a window therein;
    (b) a nuclear radiation source located inside the gauge housing proximate to said window, said nuclear radiation source having its longitudinal dimension substantially greater than its lateral dimension;
    (c) a source housing having a collimated slot therein that encloses the nuclear radiation source, said slot having a longitudinal dimension substantially greater than its lateral dimension, the depth of said slot being greater than the lateral dimension of said slot, said source housing having opposite external sides inwardly tapered toward the opening of said slot;
    (d) an energy sensor located within said gauge housing behind said source housing, such that said source housing is symmetrically positioned with respect to the sensing area of said energy sensor; and
    (e) an indicator electrically connected to said sensor.

2. A gauge as described in claim 1 with the opening of said collimating slot being contiguous with the gauge housing window.

3. A gauge as described in claim 1 including mechanical means for rotating the source housing relative to said gauge housing.

References Cited

UNITED STATES PATENTS

| 2,479,882 | 8/1949 | Wallhausen et al. |
| 3,240,940 | 3/1966 | Dukes et al. |
| 3,270,203 | 8/1966 | Crump. |

ARCHIE R. BORCHELT, Primary Examiner

U.S. Cl. X.R.

250—83.6, 105, 106